3,200,135
COPPER, CADMIUM, AND ZINC SALTS OF HALO-2,2'-DIHYDROXYDIPHENYL SULFIDES AND SULFOXIDES
Royal A. Cutler, Sand Lake, N.Y., assignor to Sterling Drug Inc., New York, N.Y., a corporation of Delaware
No Drawing. Filed July 29, 1959, Ser. No. 830,195
15 Claims. (Cl. 260—429)

This invention relates to metal salts of certain halo-2,2'-dihydroxydiphenyl sulfides and sulfoxides, and to their preparation.

More particularly, this invention relates to copper, cadmium and zinc salts of halo-2,2'-dihydroxydiphenyl sulfides and sulfoxides having the structural formula

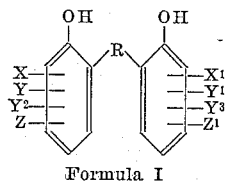

Formula I wherein: R is a member of the group consisting of —S— and —SO—; X and $X^1$ are members of the group consisting of chlorine and bromine; Y, $Y^1$, $Y^2$, and $Y^3$ are members of the group consisting of hydrogen, chlorine, bromine, and methyl; and Z and $Z^1$ are members of the group consisting of hydrogen, chlorine, and bromine, and to the preparation of said salts. As is readily apparent, the sulfides and sulfoxides of Formula I have two replaceable phenolic hydrogens and, depending on the relative number of equivalents of the metal and the sulfide or sulfoxide involved, salts having either one or both of the phenolic hydrogens replaced by the metal are possible and are included within the purview of this invention. The salts of my invention having one of the phenolic hydrogens per sulfide or sulfoxide residue replaced by the metal can be represented by the structural formula

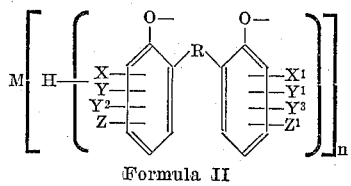

Formula II where M represents cuprous copper, cupric copper, cadmium, and zinc, and $n$ is the valence of the metal M, i.e., two in the cases of cupric copper, cadmium, and zinc, and one in the case of cuprous copper; and the salts of my invention having both of the phenolic hydrogens replaced by metal have the structural formula

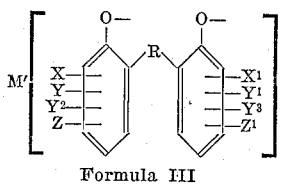

Formula III where M' represents a member of the group consisting of cupric copper, cadmium, zinc, and two cuprous coppers; and in each of Formulas II and III, each of R, X, $X^1$, Y, $Y^1$, $Y^2$, $Y^3$, Z and $Z^1$ has the same significance indicated hereinabove.

In general, my new compounds are high-melting solids. Except for the cuprous compounds, some of which are fairly soluble in water, the new salts in general have a very low water-solubility. Particularly in the case of the cupric salts of the sulfides, chelation of the metal with the sulfur atom is most likely involved.

The preparation of my new compounds (Formulas II and III) is conveniently carried out by interacting a compound of the group consisting of water-soluble cuprous, cupric, cadmium, and zinc salts with a compound of the group consisting of halo-2,2' dihydroxydiphenyl sulfides and sulfoxides having the structure depicted in Formula I above and alkali metal salts of said sulfides and sulfoxides. The use of two molecular proportions of the halo-2,2'-dihydroxydiphenyl sulfide or sulfoxide (Formula I) per molecular proportion of the water-soluble cuprous, cupric, cadmium, or zinc salt produces the respective cuprous, cupric, cadmium, and zinc salts of Formula II; and the use of equimolecular proportions of the two reactants produces the respective cuprous, cupric, cadmium, and zinc salts of Formula III. As will be understood, the use of an amount of the halo-2,2'-dihydroxyphenyl sulfide or sulfoxide (Formula I) which is more than one and less than two molecular equivalents per molecular equivalent of the water-soluble cuprous, cupric, cadmium, or zinc salt yields a mixture of salts of Formulas II and III; and, if desired, this mixture of salts can be used directly as a biocidal and biostatic agent without any need of separating the mixture of products.

The structures of the compounds of my invention are established by the mode of their preparation and by chemical analysis.

The new compounds of this invention have useful biocidal and biostatic properties. Particularly, they have useful antibacterial, antifungal, and anticoccidial properties. Some of these compounds are also toxic to snails.

Ordinarily, my new process is carried out in an aqueous medium, since the separation of the desired product from the byproducts of the reaction is in many instances facilitated by the presence of water in the reaction mixture. The preferred aqueous media are water and aqueous lower alkanol solutions such as aqueous methyl alcohol and aqueous ethyl alcohol solutions. If the aqueous reaction medium contains a relatively small amount of water, such as when 95 percent ethyl alcohol is used, it is usually advantageous to dilute the reaction mixture with water before isolating the product. When the reaction is carried out in non-aqueous media, such as anhydrous methyl alcohol or anhydrous ethyl alcohol, in such instances it is advantageous to add water, or aqueous sodium chloride solution, to the reaction mixture to facilitate isolation of the product.

The reaction takes place readily at room temperature, so that simple mixing of the reactants, preferably in solution, produces the desired salt formation. It is usually advantageous to heat the reaction mixture, however, since the particle size of the reaction product is thereby increased and its isolation is facilitated.

Any water-soluble organic or inorganic cuprous, cupric, cadmium, or zinc salt can be used in my process, and the precise nature of the anion of the water-soluble salt is not critical. By the term "water-soluble" I mean to indicate that the salt has at least a slight solubility in water. Thus, for example, cuprous chloride, although only very slightly soluble in water, is suitable for use in my process. As a matter of convenience, I ordinarily prefer to employ cuprous, cupric, cadmium or zinc sulfates, chlorides, and acetates.

The halo-2,2'-dihydroxydiphenyl sulfides and sulfoxides (Formula I) and the alkali metal salts thereof used as reactants in my process are old classes of compounds which are readily obtained. The sulfoxides are conveniently obtained by oxidizing the corresponding sulfides with peracetic acid, hydrogen peroxide, and the like, in accordance with the known procedures for converting sulfides to sulfoxides. When the alkali metal salts are employed, I ordinarily prefer to form these by appropriate reaction of the halo-2,2'-dihydroxydiphenyl sulfide or sulfoxide with one or two equivalents of alkali metal hydroxide, such as sodium hydroxide or potassium hydroxide, in aqueous solution, and then mix the resulting solution with an aqueous solution of a water-soluble cuprous, cupric, cadmium, or zinc salt.

My invention is illustrated by the following examples without, however, being limited thereto.

EXAMPLE 1

*Cupric di-[4,6-dichloro-2-(2-hydroxy-3,5-dichlorophenylmercapto)phenolate]*

A solution of 7 g. (0.035 mole) of cupric acetate in 100 ml. of water was diluted with 100 ml. of 95 percent ethyl alcohol. The resulting solution was heated almost to boiling temperature and then was quickly added to a hot solution of 25 g. (0.07 mole) of 2,2'-thiobis(4,6-dichlorophenol) in 300 ml. of 95 percent ethyl alcohol. The dark brown reaction mixture was heated to boiling for a few minutes and then allowed to cool. The reaction mixture was filtered to collect the dark brown solid which had separated from solution. The collected solid was washed well with water and was then redissolved in 300 ml. of hot 95 percent ethyl alcohol. This solution was diluted with 300 ml. of water, and on cooling a brown solid separated from the alcoholic solution. This solid was collected on a filter, washed with water, and dried. There was thus obtained 22.5 g. of cupric di-[4,6-dichloro-2-(2-hydroxy-3,5-dichlorophenylmercapto)phenolate]. This product was a dark brown powder which did not melt when heated to 300° C. *Analysis.*—Calcd. for $C_{24}H_{10}Cl_8O_4S_2Cu$: C, 37.17; H, 1.32; Cl, 36.67; S, 8.19; Cu, 8.22. Found: C, 37.30; H, 1.67; Cl, 36.75; S, 8.28; Cu, 7.35.

This compound was found to have high toxicity to snails.

EXAMPLE 2

*Cupric di-[4,6-dichloro-2-(2-hydroxy-3,5-dichlorophenylmercapto)phenolate]*

A slurry of 356 g. (1.0 mole) of 2,2'-thiobis(4,6-dichlorophenol) in 1500 ml. of methyl alcohol was stirred and heated to reflux on a steam bath, and 80 ml. of 12.5 N aqueous sodium hydroxide solution was added. There was thus obtained a pale yellow solution of the monosodium salt of 2,2'-thiobis(4,6-dichlorophenol). To this solution there was added a solution of 125 g. (0.5 mole) of cupric sulfate pentahydrate in 500 ml. of water. The resulting dark brown solution was heated and stirred, and methyl alcohol was distilled from the solution under reduced pressure (water pump). During this removal of methyl alcohol, a brown solid began to separate from solution in the distillation flask. When approximately three-quarters to one liter of methyl alcohol had been distilled off, the distillation was interrupted, two liters of water were added to the distillation residue and then distillation was resumed and continued until most of the methyl alcohol had been distilled off. The thick slurry which remained as the distillation residue was diluted with water to a volume of four liters. This mixture was heated to 90° C. and filtered while hot. The solid thus collected was washed five times with 500 ml. portions of hot water and then dried. There was thus obtained 369 g. of cupric di-[4,6-dichloro-2-(2-hydroxy-3,5-dichlorophenylmercapto)phenolate] the same product as that obtained above in Example 1. *Analysis.*—Found: Cu, 7.94%.

EXAMPLE 3

*Cupric Mono-[2,2'-thiobis(4,6-dichlorophenolate)]*

A slurry of 35.6 g. (0.1 mole) of 2,2'-thiobis(4,6-dichlorophenol) in 200 ml. of methyl alcohol was stirred and heated to reflux temperature, and to this slurry there was then added 16 ml. (0.2 mole) of 35 percent aqueous sodium hydroxide solution. On addition of this alkali, the solid in the mixture dissolved and a pale yellow solution resulted. To this solution, which contained disodium 2,2'-thiobis(4,6-dichlorophenolate), there was added a solution of 25 g. (0.1 mole) of cupric sulfate pentahydrate in 50 ml. of hot water, which caused the formation of a dark brown reaction mixture with some solid, apparently sodium sulfate, suspended therein. The reaction mixture was stirred and refluxed for five minutes more and was then poured into 1500 ml. of warm (about 60° C.), well-stirred water. The brown precipitate which separated from the solution was collected on a filter, was washed with four 500 ml. portions of warm water, and the solid was then dried at 80° C. under reduced pressure (30 mm.) for twenty hours. This product was a purple-brown solid which weighed 42.5 g.; it did not melt when heated at 300° C.; it was cupric mono-[2,2'-thiobis(4,6-dichlorophenolate)]. *Analysis.*—Calcd. for $C_{12}H_4Cl_4SO_2Cu \cdot H_2O$: Cu, 14.59. Found: Cu, 13.90.

EXAMPLE 4

*Cupric di-salts of 3,5,5'-trichloro-2,2'-dihydroxydiphenyl-sulfide*

To a solution of 6.4 g. (0.02 mole) of 3,5,5'-trichloro-2,2'-dihydroxydiphenyl sulfide in 100 ml. of 95 percent ethyl alcohol at 50° C. there was added a solution of 2 g. (0.01 mole) of cupric acetate dihydrate dissolved in a mixture of 50 ml. of 95 percent ethyl alcohol and 5 ml. of water. The resulting dark brown reaction mixture was boiled for about ten minutes. After cooling the mixture, the brown precipitate which had formed was collected on a filter, and the collected solid was washed with 95 percent ethyl alcohol and dried for two hours at 70° C. This product, which weighed 7.5 g., was a mixture of the cupric di-salts of 3,5,5'-trichloro-2,2' - dihydroxydipenylsulfate. *Analysis.*—Calcd. for $C_{24}H_{12}Cl_6O_4S_2Cu$: Cl, 30.25; S, 9.09. Found: Cl, 29.89; S, 8.81.

EXAMPLE 5

*Cupric di-[4-chloro-2-(2hydroxy-5-chlorophenylmercapto)phenolate]*

A solution of 5.6 g. (0.02 mole) of 2,2'-thiobis(4-chlorophenol) in 100 ml. of 95 percent ethyl alcohol was mixed at 50° C. with a solution of 2 g. (0.01 mole) of cupric acetate dihydrate in a mixture of 50 ml. of 95 percent ethyl alcohol and 5 ml. of water. The resulting dark brown reaction mixture was boiled for a few minutes, and the brown solid which separated from solution was collected on a filter. The solid thus collected was washed with 200 ml. of hot water and then with 200 ml. of hot 95 percent ethyl alcohol, and the washed solid was dried at 70° C. for about sixty hours. There was thus obtained 5 g. of brown solid which did not melt when heated at 300° C. This product was cupric di-[4-chloro-2-(2-hydroxy - 5-chlorophenylmercapto)phenolate]. *Analysis.*—Calcd. for $C_{24}H_{14}Cl_4O_4S_2Cu$: Cu, 10.0. Found: Cu, 8.93.

A 20 g. yield of the same product was prepared by repeating the above procedure using 25 g. of 2,2'-thiobis(4-chlorophenol) and 8.6 g. of cupric acetate dihydrate. *Analysis.*—Calcd. for $C_{24}H_{14}Cl_4O_4S_2Cu$: C, 45.34; H, 2.22; Cl, 22.33. Found: C, 44.62; H, 2.35; Cl, 22.53.

This compound was found to have very high antifungal activity against *Trichophyton interdigitale*, *Trichophyton mentagrophytes*, and *Trichophyton gypseum*.

EXAMPLE 6

*Cupric mono-[2,2'thiobis(3,4,6-trichlorophenolate)] and cupric di-[3,4,6-trichloro-2-( 2-hydroxy-3,5,6-trichlorophenylmercapto)phenolate]*

A mixture of 15 g. (0.035 mole) of 2,2'-thiobis(3,4,6-trichlorophenol) and 75 ml. of methyl alcohol was heated to reflux temperature and to the resulting clear, pale yellow solution there were added first 3.7 ml. (0.046 mole of base) of 35 percent aqueous sodium hydroxide solution and then a solution of 3.64 (0.023 mole) of anhydrous cupric sulfate in 12 ml. of water. The dark, reddish-brown reaction solution was heated and stirred for about five minutes and was then diluted with 150 ml. of water. The black oil which separated from solution solidified gradually, becoming a finely-divided dark, red-brown solid. The reaction mixture was heated and stirred for about ten minutes, and then filtered while hot. The solid thus collected was washed with five 20 ml. portions of warm (60° C.) water and then was dried at 95° C. for twenty hours under reduced pressure (30 mm.). There was thus obtained 15 g. of dark gray powder which melted at approximately 270° C. after shrinkage at approximately 230° C. This product was a mixture of cupric mono-[2,2'-thiobis(3,4,6-trichlorophenolate)] and cupric di-[3,4,6-trichloro-2-(2 - hydroxy-3,5,6-trichlorophenylmercapto)phenolate]. *Analysis.* — Calcd. for $C_{24}H_6Cl_{12}O_4S_2Cu$: Cu, 6.97. Found: Cu, 7.07.

EXAMPLE 7

*Cupric mono-[2,2'-thiobis(3,4,6-trichlorophenolate)]*

15 g. (0.035 mole) of 2,2'-thiobis(3,4,6-trichlorophenol) was dissolved in 75 ml. of refluxing methyl alcohol, and to the hot solution there were added first 7.3 ml. (0.0915 mole of base) of 35 percent aqueous sodium hydroxide solution and then a solution of 7.28 g. (0.046 mole) of anhydrous copper sulfate in 24 ml. of water. The purple-red reaction solution was heated and stirred for a few minutes, and a solid separated from solution. The reaction mixture was poured into 700 ml. of warm, well-stirred water and this mixture was filtered. The solid thus collected was washed with five 200 ml. portions of warm (60° C.) water and was then dried at 95° C. for twenty hours under reduced pressure (30 mm.). There was thus obtained 15.7 g. of dark, purple-gray powder which melted at approximately 270° C. This product was cupric mono-[2,2'-thiobis(3,4,6-trichlorophenolate)] with small amount of cupric oxide mixed therewith.

EXAMPLE 8

*Cupric di-salts of 3-chloro-5,5'-dibromo-2,2'-dihydroxydiphenyl sulfide*

A. To a slurry of 188.1 g. of 2,2'-thiobis(4-bromophenol) in 1000 ml. of glacial acetic acid at 18° C. there was added 45 ml. of sulfuryl chloride. The slurry initially thinned out and then gradually thickened. The reaction mixture was stirred vigorously for about ten minutes, was cooled to 18° C., and then was filtered. The solid thus collected was washed with glacial acetic acid and dried. There was thus obtained 123.5 g. of white solid which melted at 179–182° C. After two recrystallizations of the solid from benzene, there was obtained 82 g. of small glistening white leaflets which melted at 186–189° C. This product was 3-chloro-5,5'-dibromo-2,2'-dihydroxydiphenyl sulfide. *Analysis.*—Calcd. for $C_{12}H_7Br_2ClO_2S$: Br, 38.94; S, 7.81. Found: Br, 38.94; S, 7.94.

B. A slurry of 4.1 g. (0.01 mole) of 3-chloro-5,5'-dibromo-2,2'-dihydroxydiphenyl sulfide in 20 ml. of methyl alcohol was heated to reflux temperature, and 0.8 ml. (0.01 mole) of 35 percent aqueous sodium hydroxide was added. To the resulting clear yellow solution there was added a solution of 0.8 g. (0.005 mole) of anhydrous cupric sulfate in 3 ml. of water. The reaction mixture, from which a brown solid immediately separated, was heated and stirred for a few minutes and then was poured into 150 ml. of warm (about 60° C.) water. The mixture was stirred briefly, allowed to stand for one hour, and then filtered. The solid thus collected was washed with 30 ml. of warm water, then with 30 ml. of methyl alcohol, and finally with three 50 ml. portions of warm water. The solid was dried at 80° C. under reduced pressure (30 mm.) for eight hours. There was thus obtained 4.15 g. of brown powder which did not melt when heated at 300° C. This product was a mixture of the cupric di-salts of 3-chloro-5,5' - dibromo-2,2' - dihydroxydiphenyl sulfide. *Analysis.*—Calcd. for $C_{24}H_{12}Br_4Cl_2O_4S_2Cu$: Cu, 7.20. Found: Cu, 7.13.

EXAMPLE 9

*Cupric di-[4,6-dibromo-2-(2-hydroxy-3,5-dibromophenylmercapto)phenolate]*

5.34 g. (0.01 mole) of 2,2'-thiobis(4,6-dibromophenol) was slurried in 25 ml. of hot methyl alcohol, and 0.8 ml. (0.01 mole of base) of 35 percent aqueous sodium hydroxide solution was added. To the resulting clear, pale pink solution there was added a hot solution of 0.8 g. (0.005 mole) of anhydrous cupric sulfate in 2.4 ml. of water. The resulting purple-red reaction mixture had some dark gum in it, and to bring the gum into solution 50 ml. of methyl alcohol was added and the mixture was heated and stirred for about five minutes. The mixture was then poured into 500 ml. of warm (60° C.) water with stirring. Heating and stirring were continued for twenty minutes more, and the mixture was then filtered while hot. The solid thus collected was washed with five 100 ml. portions of warm water, and dried at 95° C. for sixteen hours. There was thus obtained 5.4 g. light reddish-brown powder which sintered a little at 200° C. and darkened, but did not melt when heated at 300° C. This product was cupric di-[4,6-dibromo-2-(2-hydroxy-3,5 - dibromophenylmercapto)phenolate]. *Analysis.* — Calcd. for $C_{24}H_{10}Br_8O_4S_2Cu$: Cu, 5.63. Found: Cu, 5.43.

EXAMPLE 10

*Cupric di-[4-chloro-6-bromo-2-(2-hydroxy-3-bromo-5-chlorophenylmercapto)phenolate]*

To a hot slurry of 1.0 g. (0.00224 mole) of 2,2'-thiobis-(4-chloro-6-bromophenol) in 5 ml. of methyl alcohol there were added first 0.18 ml. (0.00224 mole of base) of 35 percent aqueous sodium hydroxide solution and then a solution of 0.18 g. (0.00112 mole) of anhydrous cupric sulfate in 0.6 ml. of water. The resulting purple-red reaction solution was heated for two minutes longer and was then diluted with 30 ml. of warm (60° C.) water. The dark oil which separated from solution solidified gradually when heated and stirred for about twenty minutes. The reaction mixture was then filtered. The solid thus collected was washed with five 50 ml. portions of warm water and then was dried at 95° C. for sixteen hours under reduced pressure (30 mm.). There was thus obtained 0.89 g. of a dark brown powder. This product was cupric di-[4-chloro-6-bromo-2-(2-hydroxy-3-bromo-5-chlorophenylmercapto)phenolate]. It melted partially at 153–163° C. and resolidified at approximately 200° C. to yield a solid which did not melt when heated at 300° C. *Analysis.*—Calcd. for $C_{24}H_{10}Br_4Cl_4O_4S_2Cu$: Cu, 6.68. Found: Cu, 6.36.

EXAMPLE 11

*Cupric di-[3,5-dimethyl-4-chloro-2-(2-hydroxy-4,6-dimethyl-5-chlorophenylmercapto)phenolate]*

A mixture of 1.71 g. (0.005 mole) of 2,2'-thiobis(3,5-dimethyl-4-chlorophenol), 30 ml. of methyl alcohol, and 0.4 ml. (0.005 mole of base) of 35 percent aqueous sodium hydroxide solution was heated, thereby producing a clear, colorless solution. To this solution there was added a hot solution of 0.4 g. (0.0025 mole) of anhydrous cupric sulfate, in 1.2 ml. of water, and a fluocculent brown solid separated from the reaction mixture. The mixture was heated for about ten minutes, diluted with 100 ml. of warm (60° C.) water, heated for ten minutes more, and then filtered. The solid thus collected was washed with five 50 ml. portions of warm water and then dried at 95° C. for sixteen hours under reduced pressure (30 mm.). There was thus obtained 1.87 g. of light brown solid which softened at 254° C. and melted at 258–260° C. This product was cupric di-[3,5-dimethyl-4-chloro-2-(2-hydroxy-4,6-dimethyl-5 - chlorophenylmercapto)phenolate].

*Analysis.*—Calcd. for $C_{32}H_{30}Cl_4O_4S_2Cu$: Cu, 8.49. Found: Cu, 8.12.

EXAMPLE 12

*Cupric di - [4 - chloro - 6 - bromo - 3,5 - dimethyl - 2 - (2-hydroxy-3-bromo-5-chloro-4,6 - dimethylphenylmercapto)phenolate]*

1 g. (0.002 mole) of 2,2'-thiobis(3-bromo-5-chloro-4,6-dimethylphenol) was slurried in 30 ml. of methyl alcohol and 0.16 ml. (0.002 mole of base) of 35 percent aqueous sodium hydroxide was added. To the resulting colorless solution there was added a solution of 0.16 g. (0.001 mole) of anhydrous cupric sulfate in 0.5 ml. of water. The purple reaction solution was heated for about two minutes, followed by dilution with 90 ml. of warm (59° C.) water, heating and stirring were resumed for two minutes longer, and then the mixture was filtered while hot. The solid thus collected was washed with five 100 ml. portions of warm water and then was dried at 95° C. for sixteen hours under reduced pressure (30 mm.). There was thus obtained 0.72 g. of blue-gray powder which sintered at 246° C. and melted at 251° C. This product was cupric di-[4-chloro-6-bromo-3,5-dimethyl-2-(2-hydroxy-3-bromo-5-chloro - 4,6 - dimethylphenylmercapto)phenolate]. *Analysis.*—Calcd. for $$C_{32}H_{26}Br_4Cl_4O_4S_2Cu:$$

Cu, 5.97. Found: Cu, 6.00.

EXAMPLE 13

*Cadmium di-[4,6-dichloro-2-(2-hydroxy-3,5-dichlorophenylmercapto)phenolate]*

35.6 g. (0.1 mole) of 2,2'-thiobis(4,6-dichlorophenol) was added to a solution obtained by adding 8 ml. of 12.5 N aqueous sodium hydroxide solution to 200 ml. of methyl alcohol. The resulting pale yellow solution was stirred and heated to reflux temperature and there was added a solution 9.15 g. (0.05 mole) of cadmium chloride in 10 ml. of water. The reaction solution, from which a white solid separated, was heated for five minutes and was then filtered hot. The solid collected on the filter was dried for six hours at 100° C. There was thus obtained 12.5 g. of cadmium di-[4,6-dichloro-2-(2-hydroxy-3,5-dichlorophenylmercapto)phenolate] as a white powder which did not melt when heated at 300° C. *Analysis.*—Calcd. for $C_{24}H_{10}Cl_8O_4S_2Cd$: S, 7.80; Cd. 13.67. Found: S, 8.20, Cd, 13.72.

An additional 23.5 g. of this product was recovered by reheating the filtrate from the above crop, diluting with 200 ml. of water, and collecting the solid which separated from the solution on cooling.

EXAMPLE 14

*Cadmium mono-[2,2'-thiobis(4,6-dichlorophenolate)]*

A slurry of 35.6 g. (0.1 mole) of 2,2'-thiobis(4,6-dichlorophenol) in 200 ml. of methyl alcohol was heated to reflux temperature and then there was added 16 ml. (0.2 mole of base) of 35 percent aqueous sodium hydroxide solution. The resulting clear yellow solution was stirred vigorously and mixed with 18.3 g. (0.1 mole) of anhydrous cadmium chloride dissolved in 14 ml. of hot water. A curdy white precipitate formed, and this gradually became finely divided. Reflux and stirring of the reaction mixture were continued for forty minutes longer, and then the resulting slurry was diluted with 200 ml. of warm (about 60° C.) water. The solid was collected on a filter, and the product thus collected was washed once with 100 ml. of 50 percent aqueous methyl alcohol and then with warm water. There was thus obtained 44 g. of white solid after drying under reduced pressure (30 mm.) for sixteen hours. It did not melt when heated at 300° C. This product was cadmium mono[2,2'-thiobis(4,6-dichlorophenolate)]. *Analysis.*—Calculated for $C_{12}H_4Cl_4O_2SCd$: S, 6.87; Cd, 24.10. Found. S, 6.96; Cd, 23.00.

EXAMPLE 15

*Zinc mono-[2,2'-thiobis(4,6-dichlorophenolate)]*

A mixture of 35.6 g. (0.1 mole) of 2,2'-thiobis(4,6-dichlorophenol), 200 ml. of methyl alcohol, and 16 ml. of 35 percent aqueous sodium hydroxide (0.2 mole of base) was heated at reflux temperature and there was added thereto a solution of 13.6 g. (0.1 mole) of anhydrous zinc chloride in a mixture of 15 ml. of methyl alcohol and 5 ml. of water. No precipitate formed and a test of the reaction mixture showed that it was very slightly acidic. The mixture was made neutral by adding a drop of sodium hydroxide solution, and the mixture became hazy. There was then added 200 ml. of water, and a white precipitate formed. The reaction mixture was heated for five minutes longer, and was then filtered. The solid thus collected was washed once with 100 ml. of 50 percent aqueous methyl alcohol solution and then several times with hot water. After drying the solid sixteen hours at 80° C. under reduced pressure (30 mm.), the white product weighed 42.5 g.; this compound was zinc mono-[2,2'-thiobis(4,6-dichlorophenolate)]. *Analysis.*—Calcd. for $C_{12}H_4Cl_4O_2Sn$: S, 7.64; Zn, 15.59. Found, S, 7.95; Zn, 15.38.

EXAMPLE 16

*Zinc mono-[2,2'-thiobis(4,6-dichlorophenolate)] and zinc di-[4,6-dichloro-2 - (2 - hydroxy - 3,5 - dichlorophenylmercapto)phenolate]*

Following the procedure of Example 15 above, using 6.8 g. (0.05 mole) of anhydrous zinc chloride instead of 0.1 mole and 8 ml. (0.1 mole of the base) of 35 percent aqueous sodium hydroxide solution instead of 0.2 mole of the base, the product obtained was a mixture of zinc mono-[2,2'-thiobis(4,6-dichlorophenolate)]and zinc di-[4,6-dichloro - 2 - (2 - hydroxy - 3,5 - dichlorophenylmercapto)phenolate]. It was a white powder which weighed 19 g. and did not melt when heated at 300° C. *Analysis.*—Found: Cl, 26.10%; S, 8.28; Zn, 13.60%.

EXAMPLE 17

*Zinc di-[3,4,6-trichloro-2-(2-hydroxy-3,5,6-trichlorophenylmercapto)phenolate]*

Following the procedure of Example 7, but employing 23.8 g. (0.17 mole) of anhydrous zinc chloride instead of the cupric sulfate pentahydrate, the product obtained is zinc di-[3,4,6-trichloro-2(2-hydroxy-3,5,6-trichlorophenylmercapto)phenolate].

EXAMPLE 18

*Cupric di-[4,6-dichloro-2-(2-hydroxy-3,5-dichlorophenylsulfinyl)phenolate]*

A slurry of 37.2 g. (0.1 mole) of 2,2'-sulfinylbis(4,6-dichlorophenol) in 200 ml. of methyl alcohol was heated to boiling and 8 ml. (0.1 mole of base) of 35 percent aqueous sodium hydroxide solution was added. To the resulting pale yellow solution there was added a solution of 8 g. (0.05 mole) of anhydrous cupric sulfate in 25 ml. of water. The brown reaction mixture was heated and stirred on a steam bath for five minutes and then was poured into 1500 ml. of warm (60° C.) water with stirring. The light brown flocculent solid which separated from solution was collected on a filter, washed with five 300 ml. portions of warm water, and dried at 95° C. for sixteen hours under reduced pressure (30 mm.). There was thus obtained 37.6 g. of tan-brown solid which melted at approximately 200° C. and re-solidified at approximately 212° C. to a tan solid which did not melt when heated at 300° C. *Analysis.*—Calcd. for $$C_{24}H_{10}Cl_8O_6S_2Cu$$

Cu, 7.89. Found: Cu, 7.47. This product was cupric di-[4,6-dichloro-2-(2-hydroxy-3,5-dichlorophenylsulfinyl)phenolate].

EXAMPLE 19

*Cupric mono-[2,2'-sulfinylbis(4,6-dichlorophenolate)]*

A slurry of 37.2 g. (0.1 mole) of 2,2'-sulfinylbis(4,6-dichlorophenol) in 200 ml. of methyl alcohol was heated, and 16 ml. (0.2 mole of base) of 35 percent aqueous sodium hydroxide solution was added. To this resulting hot, pale yellow solution there was added a solution of 16 g. (0.1 mole) of anhydrous cupric sulfate in 50 ml. of water. The dark brown reaction mixture, from which a brown solid separated, was heated and stirred for five minutes and then was mixed with 220 ml. of warm water. Heating and stirring were continued for two minutes longer, and then the mixture was filtered while hot. The solid thus collected was washed with two 50 ml. portions of a 50 percent aqueous methyl alcohol solution and with several washings with warm water, and then dried at 95° C. for sixteen hours under reduced pressure. There was thus obtained 36.6 g. of brown solid which melted at 231–233° C. with decomposition. This product was cupric mono-[2,2'-sulfinylbis(4,6-dichlorophenolate)]. *Analysis.*—Calculated for $C_{12}H_4Cl_4O_3SCu$: Cu, 14.65. Found Cu, 14.70.

EXAMPLE 20

*Cuprous 4,6-dichloro-2-(2-hydroxy-3,5-dichlorophenylmercapto)phenolate*

A mixture of 35.6 g. (0.1 mole) of 2,2'-thiobis(4,6-dichlorophenol), 8 ml. (0.1 mole of base) of 35 percent aqueous sodium hydroxide solution, and 200 ml. of methyl alcohol was heated and stirred, and to the resulting hot solution there was added 9.9 g. of finely ground cuprous chloride. The cuprous chloride dissolved fairly rapidly and a red reaction solution was formed with a small amount of solid present. This reaction mixture was refluxed and stirred for five hours, and then was filtered. The solid collected on the filter was washed with methyl alcohol and discarded. The filtrate and wash liquid were combined and poured into 1500 ml. of warm (60° C.) water, whereupon a solid precipitated. The solid was collected on a filter, washed with four 150 ml. portions of hot water and dried. There was thus obtained 38.7 g. of light purple-brown solid which did not melt when heated at 300° C. This product was cuprous 4,6-dichloro-2-(2-hydroxy-3,5-dichlorophenylmercapto)phenolate. *Analysis.*—Calcd. for $C_{12}H_5Cl_4O_2SCu$: Cu, 15.18. Found: Cu, 12.80.

EXAMPLE 21

*Cuprous 4,6-dichloro-2-(2-hydroxy-3,5-dichlorophenylmercapto)phenolate and di-cuprous 2,2'-thiobis(4,6-dichlorophenolate)*

A mixture of 35.6 g. of 2,2'-thiobis(4,6-dichlorophenol), 16 ml. (0.2 mole of base), and 200 ml. of methyl alcohol was heated and stirred, and to the resulting hot solution there was added 19.8 g. of powdered cuprous chloride. Most of the cuprous chloride dissolved rapidly to form a dark red solution with a small amount of yellowish solid remaining undissolved in the solution. The reaction mixture was refluxed and stirred for twenty minutes and then was filtered to remove the small amount of finely divided yellow solid. The filtrate was poured into 1500 ml. of warm (60° C.) water, and the slurry which resulted was filtered. The solid thus collected was washed with water and then was dried. There was thus obtained 33.2 g. of dark purple-brown solid which did not melt when heated at 300° C. This product was a mixture of cuprous 4,6-dichloro-2-(2-hydroxy-3,5-dichlorophenylmercapto)phenolate and di-cuprous 2,2'-thiobis(4,6-dichlorophenolate). *Analysis.*—Calcd. for $C_{12}H_4Cl_4O_2SCu_2$: Cu, 26.41; and calcd. for $C_{12}H_5Cl_4O_2SCu$: Cu, 15.18. Found: Cu, 18.38.

The novel compounds (Formulas II and III) of this invention are useful for combatting deleterious bacteria and fungi present on surface areas of widely varying types, including surfaces which are either living or of inanimate nature, such as mucous membrane, skin, hair, fur, cloth, walls, floors, glassware, and the like. In such use, the new compounds are applied topically in any appropriate fashion, as by spraying, swabbing, immersing, or similar treatment of the surface on which the antibacterial or antifungal effect is desired. As will be appreciated, the particular mode of application in any given instance is chosen so as best to meet the requirements involved. For certain purposes, for example in disinfection of non-living objects of wood or metal, the new compounds can be applied per se if desired. Generally speaking, however, it has been found preferable to apply the compounds, in a concentration of at least 0.01 percent by weight, in admixture with a suitable carrier; the carrier can be biologically inert, or on the other hand can have biological activity, for example antibacterial or antifungal activity, or can contain other biologically active ingredients.

For application of compositions containing the new compounds to the surfaces of living tissue, it is of course desirable and usually necessary that the carrier be innocuous and pharmaceutically acceptable; that is to say, the carrier should be substantially non-irritating, free of objectionable odor, and of low toxicity. Pharmaceutically acceptable carriers are of course well known in the pharmaceutical art and include, for example, powders such as talc, precipitated calcium carbonate, starches, and gums; ointments such as petrolatum, hydrogenated oils, soft fats and waxes, intermediately polymerized ethylene oxide and mono- or di-glycerides of fatty acids; creams such as cetyl alcohol, stearic acid, oleic acid, and lanolin; jellies such as starch, tragacanth, agar-agar, and gelatin; liquid diluents, as for example water, liquid pertolatum, ethyl alcohol, vegetable oils, polyethylene glycol, acetone, glycerol, and syrups; and the like.

When applied by the above mentioned methods, my new compounds have useful bactericidal and bacteriostatic activity against a number of bacterial species, of which the following species are illustrative: *Staphylococcus aureus*, 209, *Eberthella typhi*, Hopkins; *Clostridium welchii*, M; and *Mycobacterium tuberculosis*, H37Rv.

The following fungi are illustrative of the species against which my new compounds have useful fungistatic and fungicidal activity: *Trichophyton interdigitale*, *Trichophyton mentagrophytes*, *aspergillus niger*, and *Monilia albicans*.

My new compounds (Formulas II and III) are useful anticoccidial agents for oral administration to prevent and suppress clinical coccidiosis or appearance of coccidiosis in poultry caused by species of the genus Eimeria. For this purpose, for greatest effectiveness the compounds are used prophylactically; that is, they are best administered prior to and concurrently with exposure of the poultry to infection or within a short time following exposure. Practically speaking, this prophylactic treatment can be most readily carried out by daily administration of the compound to poultry flocks at a dosage level affording continuous protection against coccidial infection of clinical importance. Although the optimum daily dosage of a given compound of this invention for a particular bird would of course vary in accordance with such factors as the gae and weight of the bird, intensity of exposure to infection, and the like, beneficial results are generally obtained in the management of coccidiosis when each bird receives the compound at a level of about 0.01–1.0 percent by weight of the daily diet of the bird or about 40–800 milligrams of the compound per kilogram of body weight. When administered with feeds, the percentage of the compound employed can be varied considerably, and it is only necessary to adjust the concentration so that an effective dose of the compound is ingested by the bird in consuming its daily ration of food.

Thus, for example, good results are obtained when each bird is fed daily a commercial poultry feed containing about 0.01–1.0 percent by weight of a compound of Formula II or Formula III.

Medicated feed compositions containing a compound of this invention in any desired amount can be readily prepared by dispersing the compound in the feed used as the sole or part ration of the fowl. If desired, a concentrated medicated pre-mix feed can be prepared for subsequent blending with unmedicated feed.

The following procedure and results are illustrative of the effectiveness of my new compounds (Formulas II and III), as anticoccidial agents.

Medicated poultry feeds containing respectively 0.025 percent, 0.05 percent, 0.075 percent, and 0.1 percent by weight of cupric di-[4,6-dichloro-2-(2-hydroxy-3,5-dichlorophenylmercapto)phenolate], obtained as described above in Example 2, were prepared by uniformly mixing the appropriate quantities of this salt with a commercial poultry starting mash consisting of ground grains and added minerals, vitamins, and the like. These medicated poultry feeds and the unmodified poultry mash were fed as the sole ration to nine groups of two-week old chickens, ten birds per group. Seventy-two hours after this diet was started, approximately 40,000 sporulated oocysts of *Eimeria tenella* were introduced directly into the crop of each bird. Six days after this oral inoculation, the surviving chickens (one of the control group died) were sacrificed and autopsied. Examination of the cecum of each bird was carried out to determine the extent of cecal necrosis, which was recorded as indicated below in terms of the severity of the pathologic condition. Also, a sample of cecal content was removed and examined microscopically for the presence or absence of oocysts. A comparison of the degrees of infection of treated and untreated birds showed the following results:

| Percent of Test Compound in the Feed | No. of Chickens per Group | No. of Deaths After Inoculation | Cecal Gross Pathology Score | | | | |
|---|---|---|---|---|---|---|---|
| | | | None | Slight | Moderate | Severe | Very Severe |
| Nil (Control) | 10 | 1 | 0 | 0 | 2 | 4 | 4 |
| 0.1 | 10 | 0 | 10 | 0 | 0 | 0 | 0 |
| 0.1 | 10 | 0 | 10 | 0 | 0 | 0 | 0 |
| 0.075 | 10 | 0 | 10 | 0 | 0 | 0 | 0 |
| 0.075 | 10 | 0 | 10 | 0 | 0 | 0 | 0 |
| 0.05 | 9 | 0 | 9 | 0 | 0 | 0 | 0 |
| 0.05 | 10 | 0 | 10 | 0 | 0 | 0 | 0 |
| 0.025 | 10 | 0 | 10 | 0 | 0 | 0 | 0 |
| 0.025 | 10 | 0 | 8 | 2 | 0 | 0 | 0 |

The above results showed the high efficacy of the medicated feeds in preventing and suppressing development of coccidiosis in the test birds.

I claim:
1. A copper salt of a tetrachloro-2,2'-dihydroxydiphenyl sulfide.
2. A copper salt of a hexachloro-2,2'-dihyroxydiphenyl sulfide.
3. A copper salt of a dichloro-2,2'-dihydroxydiphenyl sulfide.
4. A cadmium salt of a tetrachloro-2,2'-dihydroxydiphenyl sulfide.
5. A zinc salt of a tetrachloro - 2,2' - dihydroxydiphenyl sulfide.
6. A cupric salt of 3,3',5,5'-tetrachloro-2,2'-dihydroxydiphenyl sulfide.
7. A cupric salt of 3,3',5,5',6,6'-hexachloro-2,2'-dihydroxydiphenyl sulfide.
8. A cupric salt of 5,5'-dichloro-2,2'-dihydroxydiphenyl sulfide.
9. A cupric salt of 3,3',5,5'-tetrabromo-2,2'-dihydroxydiphenyl sulfide.
10. A cupric salt of 3,3',5,5'-tetrachloro-2,2'-dihydroxydiphenyl sulfide.
11. A cadmium salt of 3,3',5,5'-tetrachloro-2,2'-dihydroxydiphenyl sulfide.
12. A zinc salt of 3,3',5,5'-tetrachloro-2,2'-dihydroxydiphenyl sulfide.
13. Cupric di-[4,6-dichloro-2-(2-hydroxy-3,5-dichlorophenylmercapto)phenolate].
14. Cupric di - [4-chloro-2-(2-hydroxy-5-chlorophenylmercapto)phenolate].
15. Cadmium di-[4,6-dichloro-2-(2-hydroxy-3,5-dichlorophenylmercapto) phenolate].

References Cited by the Examiner

UNITED STATES PATENTS

| | | | |
|---|---|---|---|
| 2,249,626 | 7/41 | Cook et al. | 260—609 X |
| 2,346,808 | 4/44 | Winning et al. | 260—429 |
| 2,353,735 | 7/44 | Kunz et al. | 260—609 X |
| 2,399,878 | 5/46 | Van Gilder et al. | 260—609 X |
| 2,409,687 | 10/46 | Rogers et al. | 260—609 X |
| 2,459,063 | 1/49 | Cook et al. | 260—609 X |
| 2,459,754 | 1/49 | Albert | 260—609 X |
| 2,472,504 | 6/49 | Winning | 260—609 |
| 2,695,317 | 11/54 | Cutler | 260—609 |
| 2,702,302 | 2/55 | Cook et al. | 260—609 |
| 2,717,832 | 9/55 | Sulich | 260—609 |
| 2,760,988 | 8/56 | Schetty et al. | 260—609 |
| 3,044,961 | 7/62 | Morway | 260—429 |

TOBIAS E. LEVOW, *Primary Examiner.*

ABRAHAM H. WINKELSTEIN, *Examiner.*

UNITED STATES PATENT OFFICE
CERTIFICATE OF CORRECTION

Patent No. 3,200,135

August 10, 1965

Royal A. Cutler

It is hereby certified that error appears in the above numbered patent requiring correction and that the said Letters Patent should read as corrected below.

Column 4, line 38, for "-(2hydroxy-", in italics, read -- -(2-hydroxy- --, in italics; line 66, for "-[2,2´thiobis", in italics, read -- -[2,2´-thiobis --, in italics; column 5, line 8, for "20 ml." read -- 200 ml. --; column 6, line 65, for "fluocculent" read -- flocculent --; column 7, line 65, for "Reflux" read -- Refluxing --; column 8, line 25, for "$C_{12}H_4Cl_4O_2Sn$:" read -- $C_{12}H_4Cl_4O_2SZn$: --; line 41, for "8.28" read -- 8.28% --; line 49, for "-2(2-hydroxy-" read -- -2-(2-hydroxy- --; column 9, line 72, after "chlorophenolate" insert a closing parenthesis; column 10, line 65, for "gae" read -- age --.

Signed and sealed this 27th day of September 1966.

(SEAL)
Attest:

ERNEST W. SWIDER
Attesting Officer

Edward J. BRENNER
Commissioner of Patents